(12) United States Patent
Hirata

(10) Patent No.: US 10,381,660 B2
(45) Date of Patent: Aug. 13, 2019

(54) SEPARATOR FOR FUEL CELL

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 840 days.

(21) Appl. No.: 14/621,870

(22) Filed: Feb. 13, 2015

(65) Prior Publication Data

US 2015/0236358 A1    Aug. 20, 2015

(30) Foreign Application Priority Data

Feb. 19, 2014 (JP) .................. 2014-029752

(51) Int. Cl.
*H01M 8/0263* (2016.01)
*H01M 8/0258* (2016.01)
*H01M 8/0267* (2016.01)

(52) U.S. Cl.
CPC ....... *H01M 8/0263* (2013.01); *H01M 8/0258* (2013.01); *H01M 8/0267* (2013.01)

(58) Field of Classification Search
CPC .................... H01M 8/026; H01M 8/0263
See application file for complete search history.

(56) References Cited

U.S. PATENT DOCUMENTS

| 2003/0215692 A1* | 11/2003 | Rock | H01M 8/0258 |
| | | | 429/514 |
| 2011/0033775 A1* | 2/2011 | Takeguchl | H01M 8/0258 |
| | | | 429/483 |

FOREIGN PATENT DOCUMENTS

| JP | 2000-223137 | 8/2000 | |
| JP | 2004-241141 | 8/2004 | |
| WO | 2013/105956 | 7/2013 | |
| WO | WO-2013105956 A1 * | 7/2013 | ............ H01M 8/026 |

OTHER PUBLICATIONS

Japanese Office Action for JP App. No. 2015-029834 dated May 29, 2018, along with English-language translation.

* cited by examiner

*Primary Examiner* — Maria Laios
(74) *Attorney, Agent, or Firm* — Greenblum & Bernstein, P.L.C.

(57) ABSTRACT

A separator for a fuel cell includes a thin metal plate, a protrusion formed on the thin metal plate, a gas passage formed by the protrusion, and a trap that is formed by forming a recess in a wall portion of the protrusion such that the trap is provided in the gas passage to correspond to the recess.

9 Claims, 6 Drawing Sheets

SEPARATOR FOR FUEL CELL

BACKGROUND OF THE INVENTION

The present invention relates to a separator for a fuel cell.

Separators for fuel cells typically have passages for fuel gas and oxidation gas. While flowing through the passages, fuel gas and oxidation gas are consumed in power generation, so that the amount of the gases decreases gradually. Such consumption of gases changes the pressure of the gases in the passages. That is, the amounts of diffusion of the fuel gas and the oxidation gas are changed in the power generation electrodes. Thus, the diffusivities of fuel gas and oxidation gas to the power generation electrodes are uneven depending on the position, which lowers power generation performance.

Japanese Laid-Open Patent Publication No. 2000-223137 discloses a separator that includes recesses forming passages for fuel gas and oxidation gas. The passages have a smaller width at the outlet than at the inlet. Thus, the above mentioned document states that the structure improves the gas diffusivity even if the amount of fuel gas and oxidation gas is reduced while flowing.

The separator having the conventional structure disclosed in the above document has protrusions over the entire surface of a center of the separator, and the back of the protrusions are used as passages. However, the width of each passage gradually decreases toward the outlet, and the width of the protrusion is not uniform. This can warp or distort the separator.

SUMMARY OF THE INVENTION

Accordingly, it is an objective of the present invention to provide a separator for a fuel cell that restrains warping and distortion.

To achieve the foregoing objective and in accordance with one aspect of the present invention, a separator for a fuel cell is provided that includes a thin metal plate, a protrusion formed on the thin metal plate, a gas passage formed by the protrusion, and a trap that is formed by forming a recess in a wall portion of the protrusion such that the trap is provided in the gas passage to correspond to the recess.

In the above configuration, the recess formed in the wall portion of the protrusion forms the trap in the gas passage. This eliminates the necessity for differentiating the width or height of the protrusion, which forms the gas passage, between the inlet and the outlet of the gas passage. Accordingly, the separator is restrained from being warped or distorted.

DETAILED DESCRIPTION OF THE PREFERRED EMBODIMENT

One embodiment will now be described.

Figure 1:
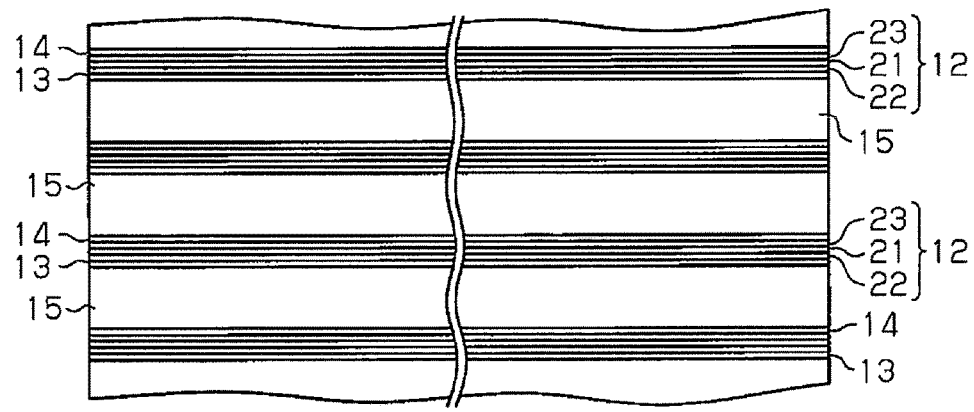
FIG. 1 is a partial front view of a fuel cell.
Figure 2:
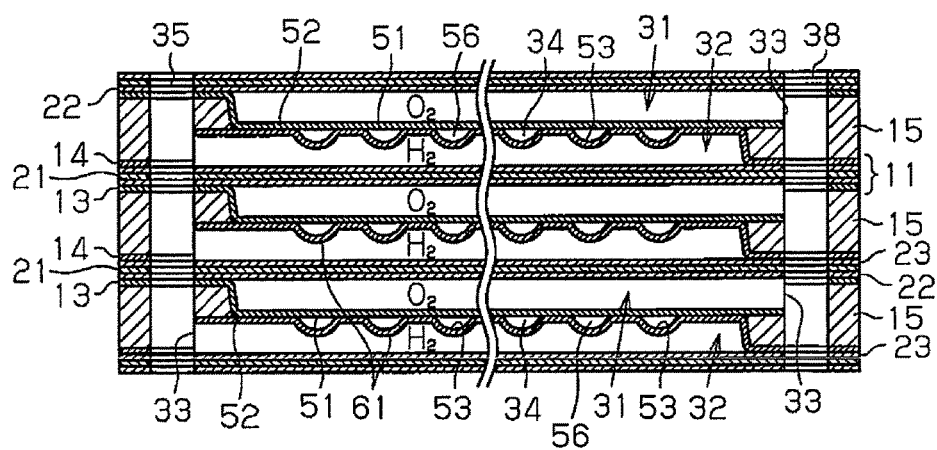
FIG. 2 is a partial cross-sectional front view of the fuel cell shown in FIG. 1.
Figure 3:
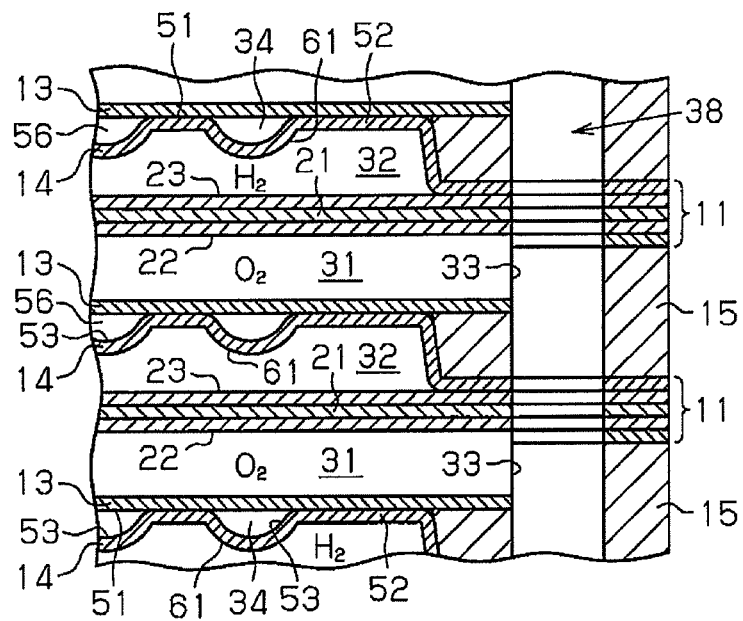
FIG. 3 is an enlarged partial cross-sectional view of the fuel cell shown in FIG. 1.

A fuel cell described below is a solid polymer type and includes a great number of laminated power generating cells 11 as illustrated in FIGS. 1 to 3.

As shown in FIGS. 1 to 3 and 9, each power generating cell 11 is rectangular and includes a plate-like power generating electrode member (hereinafter, simply referred to as an electrode member) 12 and separators 13, 14 laminated on opposite sides of the electrode member 12. The separators 13, 14 are formed of thin metal plates, for example, made of a titanium alloy or a stainless steel. In the drawings, the thicknesses of the separators 13, 14 are exaggerated.

As shown in FIG. 3, the separators 13, 14 of each adjacent pair of the power generating cells 11 contact each other. A sealing frame 15 made of an electric insulating material is arranged between the peripheral portions of each adjacent pair of the power generating cells 11. The sealing frames 15 are designed to seal the spaces between peripheral portions between adjacent power generating cells 11 and maintain the distance between the power generating cells 11.

Figure 4:
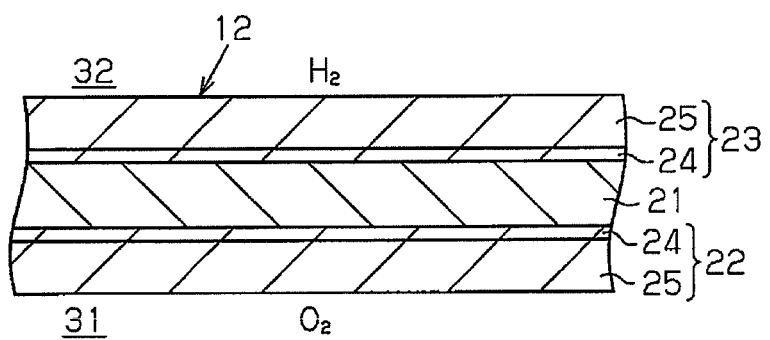
FIG. 4 is an enlarged partial cross-sectional view of a power generating electrode member of the fuel cell shown in FIG. 4.
Figure 5:
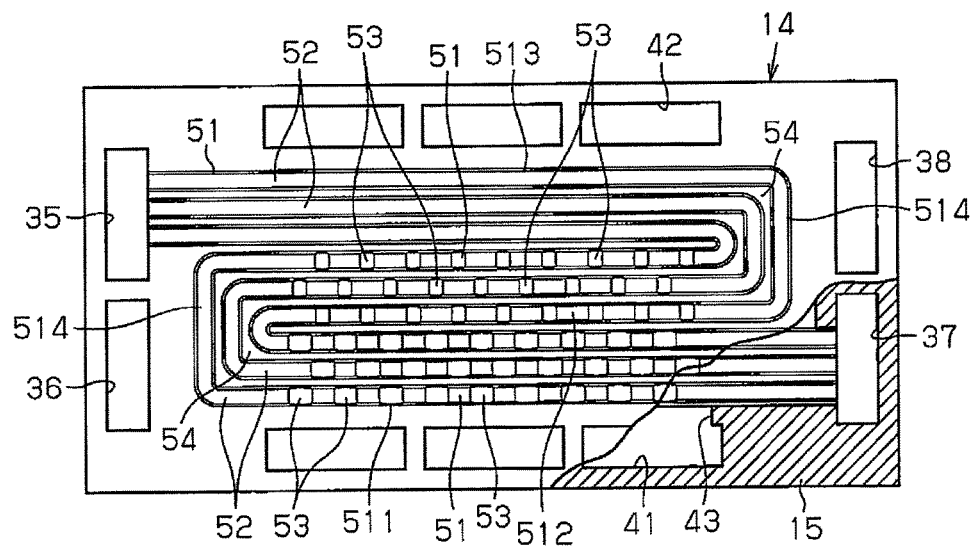
FIG. 5 is a plan view of a protrusion side of the separator of the fuel cell shown in FIG. 1.
Figure 6:
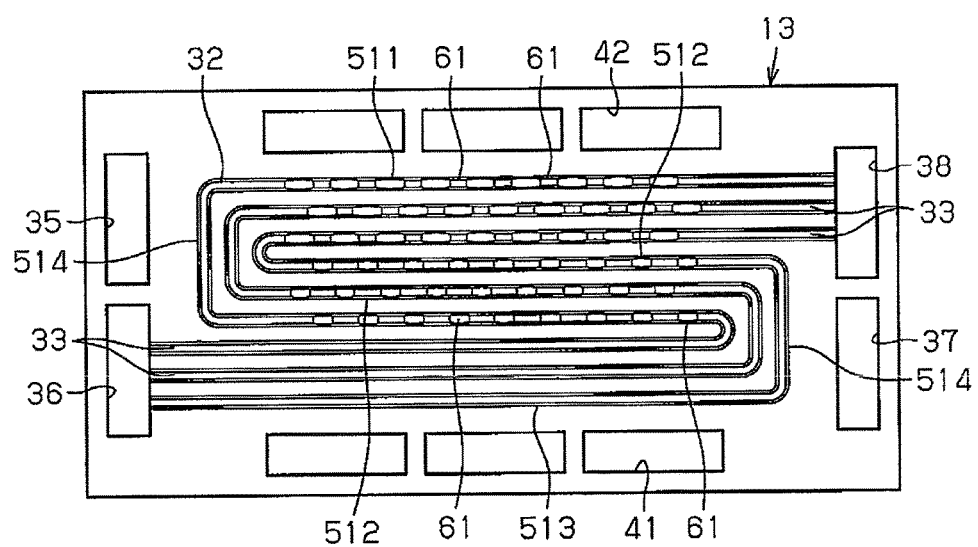
FIG. 6 is a plan view of a gas passage side of the separator shown in FIG. 5.
Figure 7:
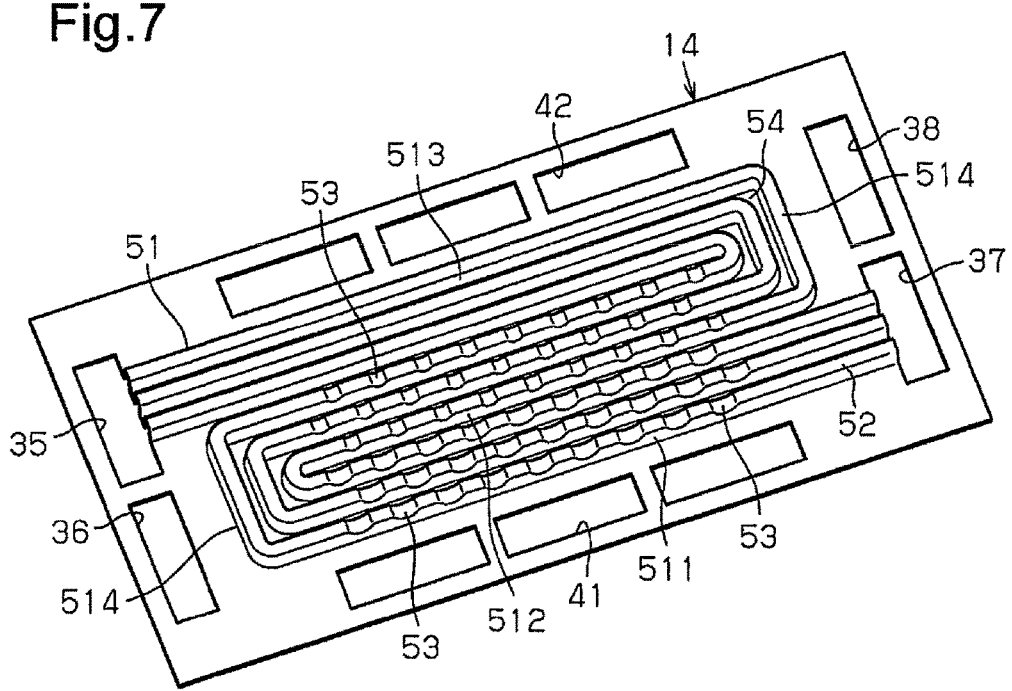
FIG. 7 is a perspective view illustrating the protrusion side of the separator shown in FIG. 5.
Figure 8:
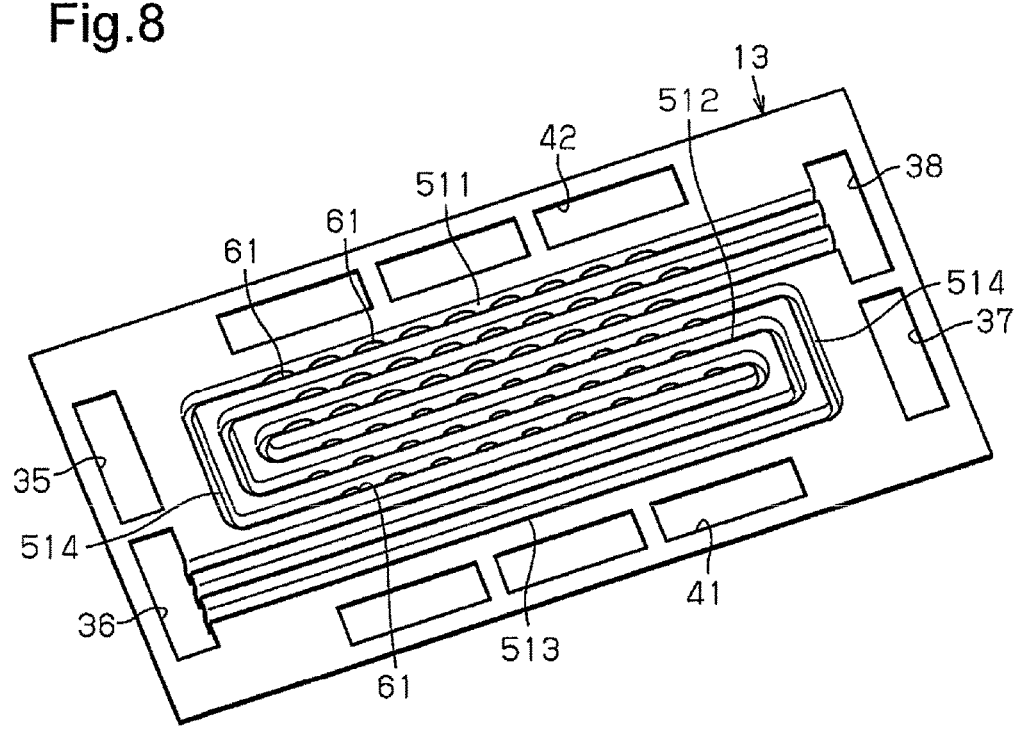
FIG. 8 is a perspective view of the gas passage side of the separator shown in FIG. 5.

As shown in FIG. 4, each electrode member 12 includes an electrolyte membrane 21, a cathode-side electrode layer 22, and an anode-side electrode layer 23. The electrode layers 22, 23 are laminated on opposite sides of the electrolyte membrane 21. The electrode layers 22, 23 each have a catalyst layer 24 and a diffusion layer 25. In the electrode layers 22, 23, the diffusion layers 25 are located on the sides on which the separators 13, 14 are laminated.

As shown in FIGS. 2 and 3, each separator 13 has gas passages 31 on the side on which the cathode-side electrode layer 22 is arranged. The gas passages 31 allow oxidation gas, which is oxide or air, to flow therethrough. Each separator 14 has gas passages 32 on the side on which the anode-side electrode layer 23 is arranged. The gas passages 32 allow fuel gas, which is hydrogen, to flow therethrough. The gas passages 31, 32 each have an opening 33 at either end.

Figure 10:
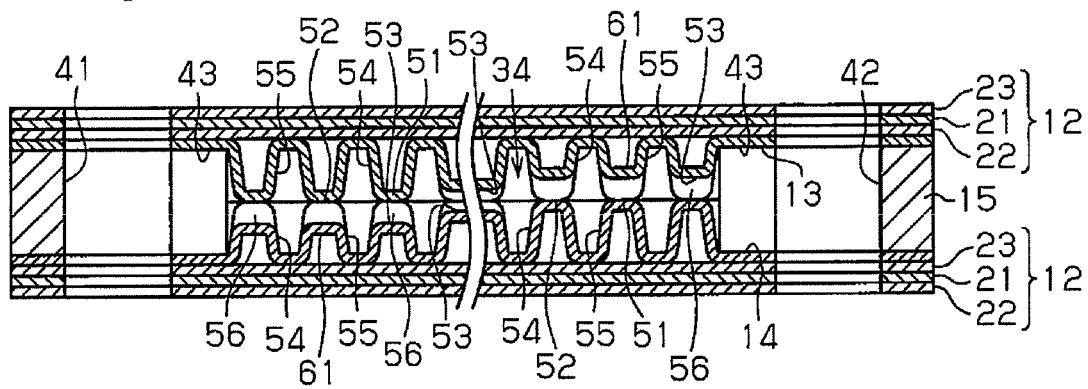
FIG. 10 is a cross-sectional view of coolant passages of the fuel cell shown in FIG. 1.

As shown in FIGS. 2, 3 and 10, coolant passages 34 are formed between adjacent separators 13, 14 to allow coolant to flow therethrough.

Figure 9:
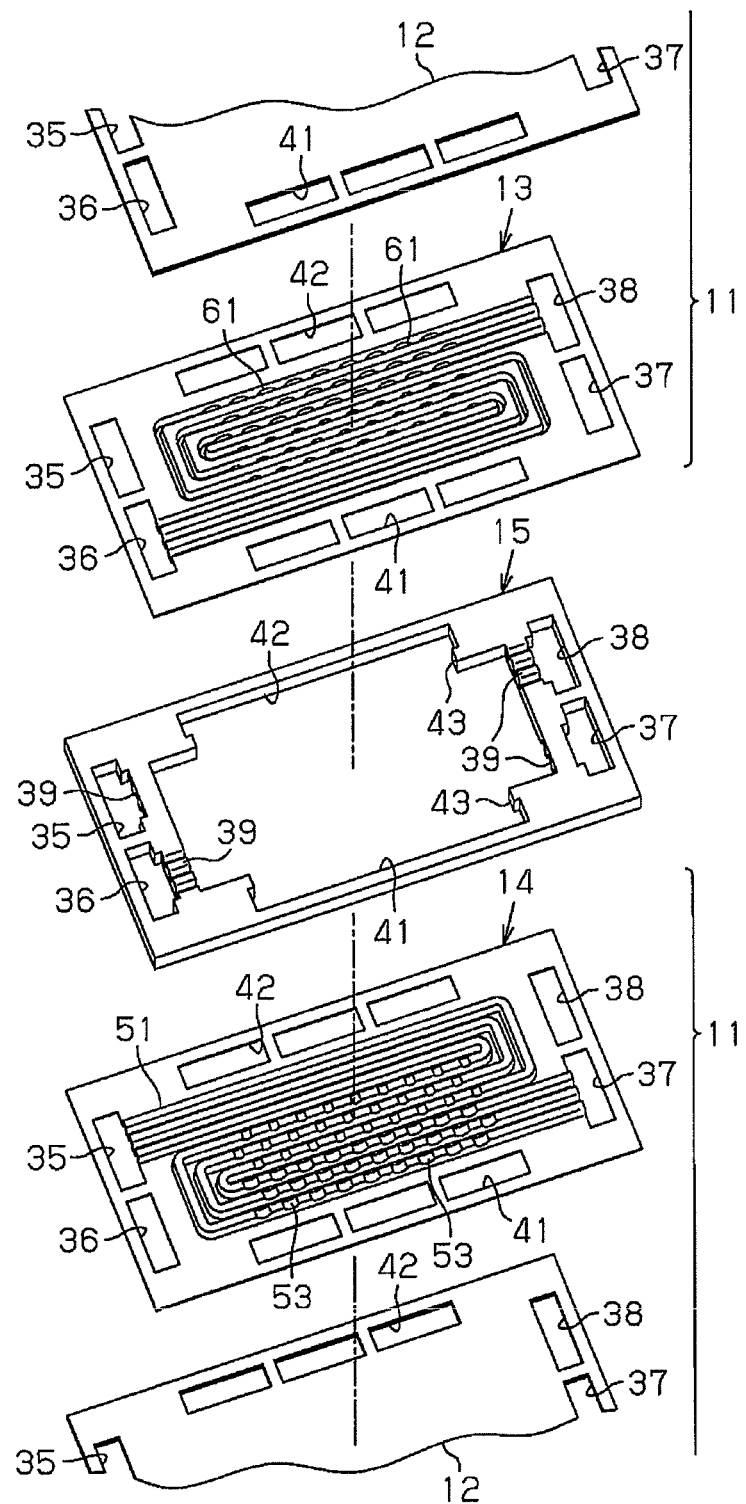
FIG. 9 is an exploded perspective view of the fuel cell shown in FIG. 1.
Figure 13:
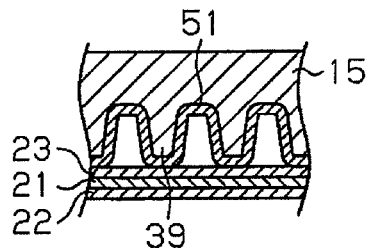
FIG. 13 is a partial cross-sectional view showing a part in the vicinity of the opening of the gas passage of the fuel cell shown in FIG. 1.

As shown in FIGS. 2, 3 and 9, an oxidation gas supply passage 35, a fuel gas supply passage 36, an oxidation gas discharge passage 37, and a fuel gas discharge passage 38 are formed to extend through the separators 13, 14, the sealing frames 15 and the electrode members 12. The passages 35, 36, 37, and 38 each communicate with the openings 33. As shown in FIGS. 9 and 13, each sealing frame 15 has support portions 39, which are located in the vicinity of the passages 35, 36, 37, and 38. The support portions 39 are fitted to and support protrusions 51, which are discussed below. In a configuration in which the openings 33 do not directly communicate with the passages 35, 36, 37, and 38 and are separated from the passages 35, 36, 37, and 38, each sealing frame 15 may be formed to have passages that connect the openings 33 with the passages 35, 36, 37, and 38.

As shown in FIG. 4, fuel gas is supplied from the gas supply passage 36 to the gas passages 32 via the openings 33. The fuel gas flows over the diffusion layer 25 of the anode-side electrode layer 23 of each electrode member 12 and is diffused into the diffusion layer 25 to be supplied to the catalyst layer 24 of the electrode layer 23. In contrast, oxidation gas is supplied from the gas supply passage 35 to the gas passages 31 via the openings 33. The oxidation gas flows over the diffusion layer 25 of the cathode-side electrode layer 22 of each electrode member 12 and diffused into the diffusion layer 25 to be supplied to the catalyst layer 24 of the electrode layer 22. An electrode reaction between the fuel gas and the oxidation gas is caused in each electrode member 12 and power is generated.

Fuel off-gas, which has not been used for generating power, is discharged to the gas discharge passage 38 from the gas passages 32 via the openings 33. After being discharged to the gas discharge passage 38, the fuel off-gas is discharged to the outside via a non-illustrated passage. Oxidation off-gas, which has not been used for generating power, is discharged to the gas discharge passage 37 from the gas passages 35 via the openings 33. After being discharged to the gas discharge passage 37, the oxidation off-gas is discharged to the outside via a non-illustrated passage.

As shown in FIGS. 9 and 10, a coolant supply passage 41 and a coolant discharge passage 42 are formed to extend through the sealing frames 15, the electrode members 12, and the separators 13, 14. Each sealing frame 15 has a communication passage 43 at a part between the coolant supply passage 41 and the coolant passages 34 and at a part between the coolant discharge passage 42 and the coolant passages 34. When heated during power generation, each electrode member 12 is cooled by coolant that flows through the coolant supply passage 41 and the coolant passages 34 of the separators 13, 14 via communication passage 43, which is formed at a part in the sealing frame 15 between the coolant supply passage 41 and the coolant passages 34. The coolant that has been used for cooling the electrode member 12 is discharged to an external passage via the communication passage 43, which is formed at a part in the sealing frame 15 between the coolant discharge passage 42 and the coolant passages 34, and the coolant discharge passage 42.

The coolant may flow from the coolant discharge passage 42 to the coolant supply passage 41. In this case, the coolant discharge passage 42 serves as a coolant supply passage and the coolant supply passage 41 serves as a coolant discharge passage.

The configuration of the separators 13, 14 will now be described.

As shown in FIGS. 5 to 8, the separators 13, 14 have an identical structure. The separators 13, 14 each have a first surface and a second surface. The second surfaces of the separators 13, 14 are opposite to the first surfaces of the separators 13, 14, respectively. The gas passages 31, 32 are arranged in central parts of the first surfaces of the separators 13, 14, but not in the peripheral portions. The gas passages 31, 32 are formed by grooves that are formed on the side opposite to the protrusions 51 (the first surface), which are formed to meander on the second surfaces of the separators 13, 14. The protrusions 51 are formed by pressing metal plates that form the separators 13, 14. Adjacent separators 13, 14 are arranged such that top walls 52 of the protrusions 51 on the second surfaces contact each other.

Each protrusion 51 has at each of the opposite ends an opening 33 serving as an inlet or an outlet of fuel gas or oxidation gas. That is, each protrusion has a first opening that corresponds to the outlet of the gas passage 31 or 32 and a second opening that corresponds to the inlet of the gas passage 31 or 32.

Each protrusion 51 includes a first section 511, a second section 512, and a third section 513, which extend along the long sides of the electrode member 12. Each protrusion 51 also includes a pair of fourth sections 514, which extends along the short sides of the electrode member 12. The first section 511 is located in a downstream section of the gas passage 31 or 32, and the third section 513 is located in an upstream section of the gas passage 31 or 32. The first section 511 and the second section 512, which extend along the long sides and are parallel with each other, each have recesses 53, which are formed by denting the top wall 52 of the protrusion 51. The recesses 53 are arranged substantially at equal intervals. The recesses 53 formed in a part close to the opening 33 that correspond to the first opening, that is, the recesses 53 formed in the first section 511, which is located on the downstream section of the gas passage, are formed to be wider and deeper than the recesses 53 formed in the second section 512, which is located in the upstream section of the first section 511 of the gas passage. That is, the volume of the recesses 53 formed in the first section 511 is greater than the volume of the recesses 53 formed in the second section 512. The formation of the recesses 53 forms traps 61 that correspond to the recesses 53 in the gas passage 31, 32. Therefore, the projecting amount of the traps 61 located in the downstream sections in the gas passages 31, 32 is greater than the projecting amount of the traps 61 located in the upstream sections.

Figure 11:
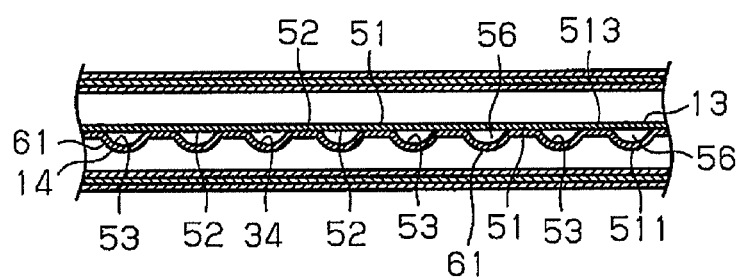
FIG. 11 is a cross-sectional view of the coolant passages at a position different from the position shown in FIG. 10.
Figure 12:
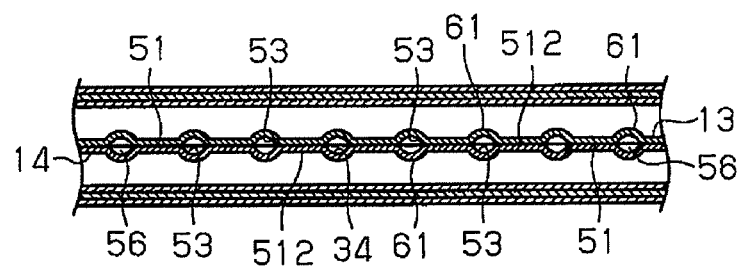
FIG. 12 is a cross-sectional view of the coolant passages at a position different from the positions shown in FIGS. 10 and 11.

Adjacent separators 13, 14 are arranged such that the top walls 52 of the protrusions 51 on the second surfaces contact each other, so that first spaces 55 are formed by meandering grooves 54 between adjacent protrusions 51. Also, second spaces 56 are formed between the recesses 53 formed in the top walls 52 of the protrusions 51 of adjacent separators 13, 14 and between the recesses 53 and the top walls 52 of the protrusions 51 of the separators 13, 14. The first spaces 55 and the second spaces 56 form the coolant passages 34. As clearly illustrated in FIGS. 11 and 12, the variations in the volumes of the recesses 53 substantially equalize the passage cross-sectional areas of the second spaces 56. That is, FIG. 11 shows a section in which each second space 56 is formed by a large-volume deep recess 53 formed in one of adjacent separators 13, 14 and the top wall 52 of the other one of the adjacent separators 13, 14 that has no recess 53. FIG. 12 shows a section in which each second space 56 is formed by a pair of small-volume shallow recesses 53 formed in adjacent separators 13, 14. The volumes of the recesses 53 are determined such that the passage cross-sectional area of each second space 56 shown in FIG. 11 is substantially equal to the passage cross-sectional area of each second space 56 shown in FIG. 12.

Functions of the separators 13, 14 of the embodiment will mainly be described below.

To generate power using the fuel cell, oxidation gas is caused to flow through the gas passages 31 and fuel gas is caused to flow through the gas passages 32. In this case, the traps 61 are formed in the first sections 511 and the second sections 512, which are formed in the downstream sections of the gas passages 31, 32. The traps 61 located in the downstream sections of the gas passages 31, 32 have a greater projecting amount. That is, the projecting amount of the traps 61 in the first section 511 is greater than that of the traps 61 in the second section 512, which is located on the upstream side of the first section 511 in each of the gas passages 31, 32. Thus, the passage cross-sectional area of the gas passages 31, 32 are substantially smaller in the downstream section than in the upstream section. Therefore, even if fuel gas and oxidation gas flow through the gas passages 31, 32 and are reduced due to reaction, the gas pressure is restrained from changing. This reduces the variation in the degree of diffusion of gas in the diffusion layer 25. The electrode members 12 therefore maintain a high power generation performance in the entire surfaces.

During generation of power, the electrode members 12 are heated and thus need to be cooled. The electrode members 12 are cooled by coolant flowing through the coolant passages 34. In this case, since the first and second spaces 55, 56, which form the coolant passages 34, have uniform passage cross-sectional areas, the flow rate and the flow velocity of the coolant are equalized substantially over the entire regions in the electrode members 12. Thus, uniform and effective cooling is performed over the entire regions in the electrode member 12.

The above embodiment achieves the following advantages.

(1) The recesses 53 are formed on the top wall 52 of each protrusion 51, which has a gas passage 31 or 32 on the back, and the recesses 53 form traps 61, which restrict the flow rate of gas in the gas passage. Thus, each protrusion 51 can be formed to have the same width and height over the entire separators 13, 14 without adjusting the height or the width of the protrusion 51. This effectively prevents the separators 13, 14 from being warped or distorted.

(2) The separators 13, 14 of one type having the same shape are arranged such that the top walls 52 of the separators 13, 14 contact each other, such that the fuel gas passages 32 and the oxidation gas passages 31 are formed. This simplifies the molding apparatus and molding process for the separators 13, 14.

(3) The recesses 53, which are formed on the top walls 52 of the protrusions 51, form both of the coolant passages 34 and the traps 61 for oxidation gas and fuel gas. In other words, the recesses 53 have the function of the traps 61 as well as the function of the coolant passage 34. This eliminates the necessity for providing a dedicated coolant passage and traps and thus reduces the number of positions in the separators 13, 14 that need processing.

(4) The gas passages 31, 32 each have in it the traps 61 for reducing the cross-sectional area in the downstream section. Thus, even if fuel gas and oxidation gas are reduced while flowing, changes in the gas pressure is reduced. Therefore, the degree of diffusion of gas in the diffusion layer 25 is substantially maintained at a constant level. This enables highly efficient power generation.

(5) The recesses 53 are formed in the first sections 511 and the second sections 512 of the protrusions 51, which extend along the long sides of the separators 13, 14. This allows coolant to flow in the direction along the short sides of the separators 13, 14 in a wide range along the long sides of the separators 13, 14. This increases the cooling efficiency.

The above embodiment may be modified as follows.

In the above illustrated embodiment, the recesses 53 are formed in the first sections 511 and the second sections 512 of the protrusions 51. However, the recesses 53 may be formed in other sections.

In the above illustrated embodiment, the recesses 53 are formed by denting the top walls 52 of the protrusions 51. However, the recesses 53 may be formed by denting side walls of the protrusions 51.

The above illustrated embodiment may be applied to a configuration in which an additional separator is provided between adjacent separators 13, 14. In this case, recesses 53 need to be formed in the top walls 52 of the protrusions 51 in the first sections 511, the second sections 512, and the third sections 513. In this case, recesses 53 may also be formed on top walls of the fourth sections 514.

What is claimed is:

1. A separator for a fuel cell, comprising:
a thin metal plate having a first surface and a second surface that is opposite to the first surface;
a protrusion formed on a second surface side of the thin metal plate and defining a groove that opens in a first surface side of the thin metal plate;
a gas passage formed by the groove on the first surface side;
a plurality of recesses formed at spaced intervals on the second surface of the thin metal plate such that each recess of the plurality of recesses defines a coolant passage that extends in a direction that traverses the gas passage; and
a plurality of traps that are formed by the plurality of recesses and project into the gas passage from the first surface such that the plurality of traps are provided in the gas passage in a gas flow direction.

2. The separator for a fuel cell according to claim 1, wherein the second surfaces defines a top wall of the protrusion.

3. The separator for a fuel cell according to claim 1, wherein
the protrusion is one of a plurality of meandering protrusions, and
the plurality of recesses are formed in parallel sections of the plurality of meandering protrusions.

4. The separator for a fuel cell according to claim 1, wherein
the protrusion has a first opening and a second opening at opposite ends, and
the plurality of recesses are located in a section of the protrusion that includes the first opening.

5. The separator for a fuel cell according to claim 4, wherein
the first opening corresponds to an outlet of the gas passage,
the second opening corresponds to an inlet of the gas passage,
the section that includes the first opening is a first section of the protrusion,
the protrusion includes a second section that is located on an upstream side of the first section in the gas passage,
the second section also has a plurality of recesses, and
a depth of each of the plurality of recesses formed in the first section is greater than a depth of each of the plurality of recesses formed in the second section.

6. A fuel cell comprising:
a first separator including:
a first thin metal plate;
a first protrusion formed on the first thin metal plate;
a first gas passage formed by the first protrusion; and
a first trap that is formed by forming a first separator recess in a first wall portion of the first protrusion such that the first trap is provided in the first gas passage to correspond to the first separator recess;
a second separator including:
    a second thin metal plate;
    a second protrusion formed on the second thin metal plate;
    a second gas passage formed by the second protrusion; and
    a second trap that is formed by forming a second separator recess in a second wall portion of the second protrusion such that the second trap is provided in the second gas passage to correspond to the second separator recess; and
a plate-like electrode member, wherein
the first separator is laminated on the electrode member such that a first surface of the first separator on which the gas passage is formed is adjacent to the electrode member,
the second separator is brought into contact with a second surface of the first separator that is opposite to the first surface such that a space is formed between the first and second separator recesses, and
the space forms a coolant passage.

7. The fuel cell according to claim 6, wherein
the first and second separator recesses each have first and second recesses, wherein a depth of the first recess is greater than a depth of the second recess,
the first recess of the first separator is arranged at a position that faces a part of a top wall of the second separator where the first recess is absent, and
the second recess of the first separator is arranged at a position that faces the second recess of the second separator.

8. A separator for a fuel cell, comprising:
a thin metal plate;
a protrusion formed on the thin metal plate;
a gas passage formed by the protrusion; and
a trap that is formed by forming a recess in a wall portion of the protrusion such that the trap is provided in the gas passage to correspond to the recess, wherein
the protrusion has a first opening and a second opening at opposite ends,
the recess is located in a first section of the protrusion that includes the first opening,
the first opening corresponds to an outlet of the gas passage,
the second opening corresponds to an inlet of the gas passage,
the protrusion includes a second section located on an upstream side of the first section in the gas passage,
the second section also has a recess, and
a depth of the recess formed in the first section is greater than a depth of the recess formed in the second section.

9. The separator for the fuel cell according to claim 1, wherein
the protrusion has a first opening and a second opening at opposite ends,
the first opening corresponds to an outlet of the gas passage,
the second opening corresponds to an inlet of the gas passage,
the thin metal plate has a rectangular shape,
the first opening and the second opening each open in a direction along long sides of the rectangular shape, and
the direction that traverses the gas passage is a direction along short sides of the rectangular shape.

* * * * *